United States Patent [19]
Baldino

[11] Patent Number: 5,360,376
[45] Date of Patent: Nov. 1, 1994

[54] QUICK RELEASE DISCONNECT COUPLING DEVICE FOR DRIVE SHAFT SEGMENTS

[75] Inventor: Neil F. Baldino, Ridgefield, Conn.

[73] Assignee: United Technologies Corporation, Hartford, Conn.

[21] Appl. No.: 3,756

[22] Filed: Jan. 13, 1993

[51] Int. Cl.⁵ .......................... F16D 3/18; F16D 3/10
[52] U.S. Cl. ..................................... 464/154; 464/901
[58] Field of Search ................... 464/35, 36, 154, 901, 464/177; 403/322, 325; 74/2, 618, 840

[56] References Cited

U.S. PATENT DOCUMENTS

| | | | |
|---|---|---|---|
| 1,757,125 | 5/1930 | Levedahl | 464/35 X |
| 2,438,540 | 3/1948 | Cole | 464/154 X |
| 3,503,225 | 3/1970 | Shindelar et al. | 464/901 X |
| 3,551,013 | 12/1970 | Trajanowski et al. | 464/901 X |
| 3,747,966 | 7/1973 | Wilkes et al. | 464/901 X |
| 4,157,019 | 6/1979 | von Allworden | 464/177 X |
| 4,289,414 | 9/1981 | Recker | 464/901 X |
| 4,457,734 | 7/1984 | Cohen | 464/30 |

FOREIGN PATENT DOCUMENTS

| | | | |
|---|---|---|---|
| 2735002 | 2/1978 | Germany | 403/322 |
| 737679 | 6/1980 | U.S.S.R. | 464/154 |

Primary Examiner—Clifford D. Crowder
Assistant Examiner—John J. Calvert
Attorney, Agent, or Firm—Terrance J. Radke; Robert E. Cannuscio

[57] ABSTRACT

A coupling device for transmitting torque between two rotating drive shaft segments. The coupling device includes a locking mechanism for preventing axial excursions of the drive shaft segments relative to one another when the drive shaft segments are coupled and transmitting torque. The coupling device, furthermore, provides a means for quick disconnect of the drive shaft segments when the transmission of torque is no longer desired and decoupling is preferred. The coupling device, additionally, includes a guide pin and sleeve arrangement for piloting the drive shaft segments during coupling. A drive system is also provided which includes a flexible coupling for accommodating axial and angular misalignment of the drive shaft segments relative to one another.

11 Claims, 7 Drawing Sheets

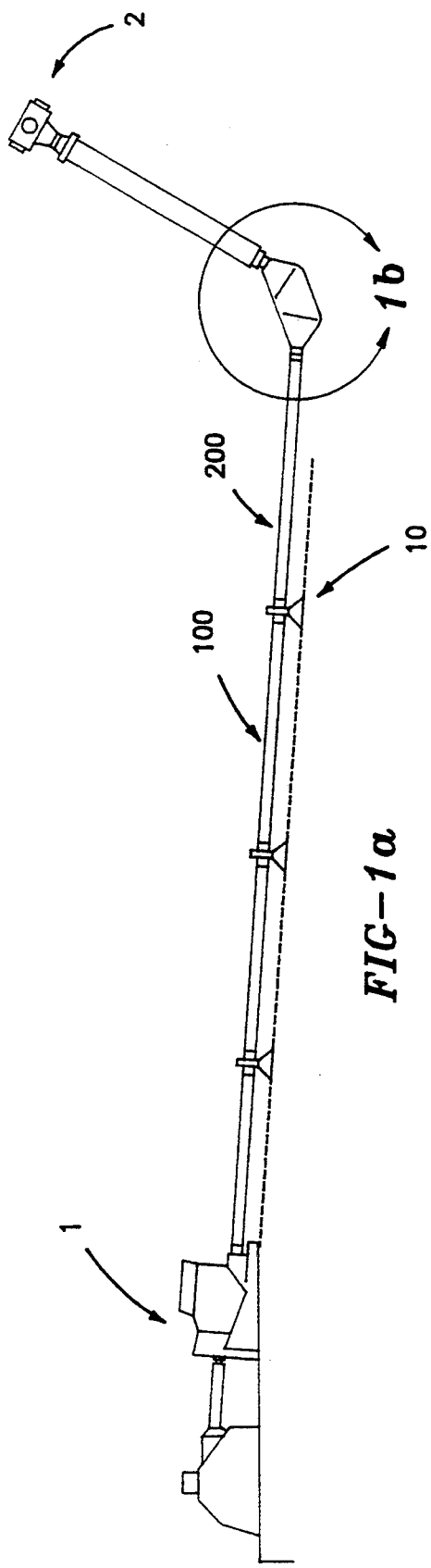
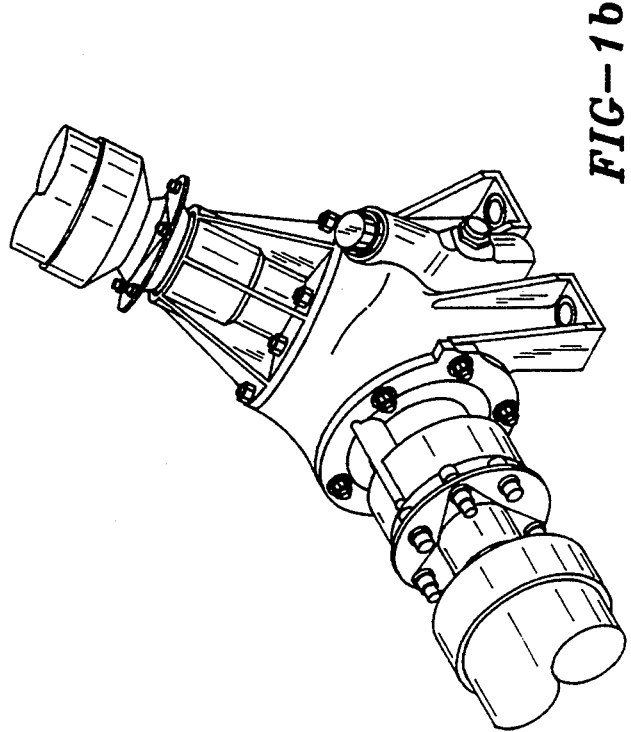
FIG-1a
FIG-1b

QUICK RELEASE DISCONNECT COUPLING DEVICE FOR DRIVE SHAFT SEGMENTS

TECHNICAL FIELD

The present invention relates to coupling devices between rotating drive shaft segments and, more particularly, to an improved disconnectable coupling device which limits axial displacement thereof while permitting angular misalignment.

BACKGROUND OF THE INVENTION

Drive shafts are used primarily as a means for transmitting power from a power source, i.e., an engine or transmission, to a driven component, i.e., a tail rotor of a helicopter. The power transmitted is principally a function of the rotational velocity of the shaft, typically designated in revolutions per minute (RPM), and the applied torque or twisting moment.

In designing a drive system, many factors must be weighed in order to provide the optimum design configuration. While it may be desirable to utilize a single drive shaft, one end being attached to the power source and the other end being attached to the driven component, in most instances this would not be feasible for two main reasons. Firstly, the driven component may not lie along the same axis as the power source requiring the drive system to transmit the power along two distinct axes, e.g., first aft, then up.

Secondly, the maximum speed of the drive shaft is limited by the critical shaft speed, above which instability occurs. The critical speed of a shaft is based, in part, on the length between supports, the physical and geometric properties of the shaft, and any loads, e.g., vibratory loads, that are applied to or supported by the shaft. The critical speed is defined as the natural frequency (point of instability) of the shaft.

It is primarily due to these two factors that a typical drive system consists of a series of segmented drive shafts, coaxially disposed, each supported at or near its ends and joined together through a coupling device. The coupling device is designed to transmit torque from an input drive shaft segment to an output drive shaft segment. FIG. 1a depicts a typical helicopter drive system with several drive shaft segments. As can be seen, the driven component (tail rotor) is located aft and above the power source (transmission), requiring the power to be transmitted along two distinct axes through a complicated gear system as shown in FIG. 1b. In a helicopter configuration, where the drive shaft speed can exceed 1800 RPM, torque can be as much as 27000 inch-pounds, and vibratory loads are extremely common, a segmented drive system is, in most cases, mandatory.

The overall drive system may also incorporate a flexible coupling between the drive shaft segments for accommodating angular misalignment between the shaft ends. Such misalignment can be due, in part, to the vibratory loads acting on the drive shaft segments, as well as the overall flexibility of the supporting structure. In a helicopter aircraft, where vibratory loads can cause excessive motion of the shafts relative to one another, e.g., misalignment of up to 2.5 degrees, the drive system must provide substantial flexibility while maintaining torque transmission and a lightweight configuration. An example of such a flexible coupling is described in U.S. Pat. No. 4,457,734.

When a drive system is operating, it is necessary that continuous engagement be maintained between the drive shaft segments for transmitting power. However, when the system is inoperative, e.g., when power is not being transmitted from the power source to the driven component, continuous engagement of the drive shaft segments is no longer required and, in some instances, complete disengagement is preferred. An example where complete disengagement would be preferred is on a helicopter which has a folding tail section for minimizing storage space on an aircraft carrier or during transport in the cargo bay of a plane. On such an aircraft, the drive shaft segments must be disengaged from one another to permit the tail section to fold about a hinge.

In order for two drive shaft segments to be disengagable the coupling device must be substantially more complex then the system disclosed in U.S. Pat No. 4,457,734, yet must remain lightweight. In many instances, the engagement/disengagement must be accomplished relatively quickly, thus requiring the coupling device to be actuatable. The coupling device disclosed in U.S. Pat. No. 4,457,734 does not provide a means for quick disengagement.

One prior art method for addressing this concern is through the use of a spline arrangement wherein male splines, disposed on the end of one drive shaft segment, slidably mate with female splines of an adjacent drive shaft segment. The female splines are slidably disposed on the outer diameter of the drive shaft segment and urged into engagement by means of a coil spring. The torque is transmitted from the first drive shaft segment through the splines to the second drive shaft segment. Disengagement is accomplished by forcing the female spline to disengage from the male spline by compressing the coil spring.

A second type of coupling device that is currently used consists of two face gears disposed on the ends of the drive shafts to be coupled. The gear teeth of the face gears mesh with one another, transmitting load therebetween. The face gears are held in mesh by a coil spring which forces one face gear into the other. Disengagement of the face gears is accomplished by compressing the coil spring.

One difficulty associated with the disengagable coupling devices described above is that excessive flexing or motion of the drive shaft segments or their support structure could result in disengagement of the splines or gear teeth, resulting in loss of power transmission between the drive shaft segments.

The flexing of the drive shaft segments or its support structure can also result in excessive wear of the splines or gear teeth, thus requiring frequent maintenance and repair of the same.

Furthermore, an additional deficiency that exists with prior art coupling devices having intermeshing face gears, relates to the manner in which torque is transferred between the face gears. The input gear transmits the torque to the output gear as normal and tangential components on each tooth face. The tangential components of the torque serve to force the face gears apart. The constant forcing apart of the face gears results in significant wear of the individual gear teeth, necessitating continual monitoring and repair. Utilizing a stiffer coil spring would reduce this occurrence but would thereby require a considerably stronger means for compressing the coil spring when disengagement is desired.

This results in a relatively heavy design and, therefore, is not a practical solution.

A need, therefore, exists for providing a coupling device which prevents disengagement of two drive shaft segments and minimizes axial displacement thereof, while providing a means for quick disengagement when desired. It is also desired that the coupling device provide a means for accommodating angular misalignment of the shaft segments.

SUMMARY OF THE INVENTION

One object of the present invention is to provide a drive system which includes a coupling device disposed between two drive shaft segments that incorporates a means for locking the drive shaft segments during engagement.

Another object of the present invention is to provide a drive system which includes a coupling device between two drive shaft segments that permits minimal axial displacement thereof.

Yet another object of the present invention is to provide a drive system which includes a coupling device between two drive shaft segments that provides a means for guiding the two drive shafts during coupling.

Still another object of the present invention is to provide a drive system having sufficient flexibility for accommodating axial and angular misalignment of the drive shaft segments.

These and other objects are achieved through the drive system of the present invention which includes a coupling device which is disposed between and mounted to input and output drive shaft segments and includes input and output disconnect portions mounted to the input and output drive shaft segments respectively, a means for transmitting torque from the input drive shaft segment to the output drive shaft segment and a locking means for securing the input drive shaft segment to the output drive shaft segment.

The transmission of torque from the input drive shaft segment to the output drive shaft segment is accomplished through a spline or gear arrangement. In the case of a spline arrangement, a male input spline is mounted to the input disconnect portion and a female spline assembly is disposed about and slidably mounted to the male input spline. The splines of the female spline assembly and the male input spline are intermeshed for transmitting torque. A male output spline is mounted to the output disconnect portion of the output drive shaft segment and, furthermore, is intermeshed with the female spline assembly when the input drive shaft segment and the output drive shaft segment are coupled. The intermeshing between splines permits the transmission of torque from the input drive shaft segment to the output drive shaft segment.

In the present invention decoupling of the splines is accomplished by sliding the female spline assembly, by actuation of a yoke, away from the male output spline, thereby compressing a coil spring that functions to maintain the intermeshing. Once the splines are decoupled, the transmission of torque can no longer occur, thereby permitting the separation of the drive shaft segments. The incorporation of the present invention in a helicopter permits the tail section of the aircraft to be folded in order to facilitate transport.

In order to prevent uninvited disengagement of the drive shaft segments, the present invention incorporates a locking mechanism for maintaining engagement of the female spline assembly to the male output spline assembly when the drive shaft segments are coupled. The locking mechanism includes a cage segment, mounted about the female spline assembly, which includes a plurality of apertures formed therethrough. Each aperture is configured to hold a locking ball disposed therein, while permitting a portion of the locking ball to protrude through the inboard surface of the cage segment.

An output coupler is mounted to the male output spline and has a plurality of locking detents formed thereon. The output coupler is positioned such that the locking detents lie below the apertures of the cage segment when the two drive shaft segments are coupled. Furthermore, the protruding portion of the each locking ball seats within a corresponding locking detent.

An outer housing is slidably disposed about the cage segment and functions as a means for retaining the locking balls within the apertures. The outer housing has a locked and unlocked position wherein, in the locked position, the outer housing secures the locking balls within the apertures preventing motion thereof. In the unlocked position, the outer housing permits the locking balls some limited motion within the apertures. Moreover, when the drive shaft segments are coupled, the locked position of the outer housing secures the locking balls within the locking detents resulting in the drive shaft segments being locked in engagement. When the outer housing is in its unlocked position, the drive shaft segments are still coupled but are no longer locked in that position.

A guide means is also provided for piloting the input and output drive shaft segments during coupling and consists of a guide pin and sleeve arrangement.

A drive system is also provided which includes a flexible coupling disposed between the output disconnect portion and the output drive shaft segment. The flexible coupling permits the output disconnect portion a minimal amount of axial displacement with respect to the output drive shaft segment. In addition, the flexible coupling adjusts for angular misalignment of the output disconnect portion with respect to the output drive shaft segment while maintaining torque transmission. A redundancy is designed into the system to provide continuous torque transmission in the event that the flexible coupling falters.

The foregoing and other objects, features and advantages of the present invention will become more apparent in light of the following detailed description of the exemplary embodiments thereof, as illustrated in the accompanying drawings.

BRIEF DESCRIPTION OF THE DRAWINGS

A more complete understanding of the present invention and the attendant features and advantages thereof may be had by reference to the following detailed description of the invention when considered in conjunction with the accompanying drawings wherein:

FIGS. 1a–b illustrate a drive system as it is embodied in a helicopter aircraft including several drive shaft segments and coupling devices.

DETAILED DESCRIPTION OF THE PREFERRED EMBODIMENT

Figure 2:
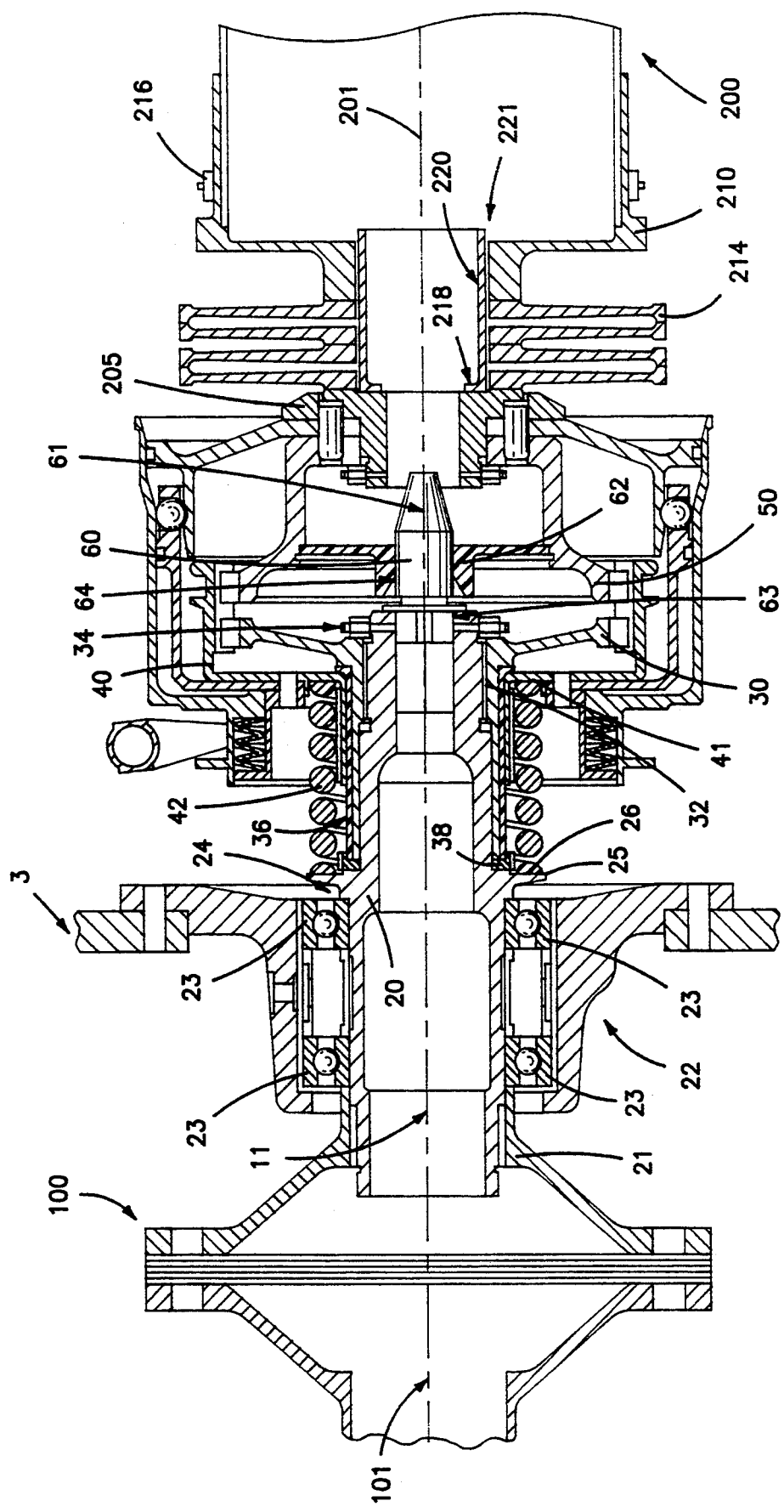
FIG. 2 is a cross-sectional view of a coupling device, according to the present invention, for a splined drive system.

Referring now to the drawings wherein like reference numerals illustrate corresponding or similar elements, FIG. 1a shows two drive shaft segments 100, 200 which are part of a drive system also comprising a power source 1, such as a transmission, and a driven component 2, such as a tail rotor. The drive shaft segments 100, 200 function to transfer power from the power source 1 to the driven component 2. The drive system typically contains a series of drive shaft segments, the number depending on the distance between the power source 1 and the driven component 2. The drive shaft segments 100, 200 are connected to one another by a coupling device 10. Referring to FIG. 2, for convenience only portions of two drive shaft segments 100, 200 are shown along with the coupling device 10 of the present invention. The preferred embodiment depicts the present invention as it would be utilized in a helicopter drive system, but those skilled in the art will appreciate the applicability of the invention to any drive system requiring drive shaft segments to be coupled to one another.

The coupling device 10 includes an input disconnect portion 20, which is mounted to the aft end of the input drive shaft segment 100. In the preferred embodiment, the longitudinal axis 11 of the input disconnect portion 20 is coincident with the longitudinal axis 101 of the input drive shaft segment 100 thereby permitting the input disconnect portion 20 to rotate about the same axis as the input drive shaft segment 100. The input disconnect portion 20 is preferably connected to the input drive shaft segment 100 by a spline arrangement 21, which permits the transfer of torque from the input drive shaft segment 100 to the input disconnect portion 20. The input disconnect portion 20 functions as an extension of the input drive shaft segment 100. It should be noted that the input disconnect portion 20 may be connected to the input drive shaft segment 100 in any of a number of ways known to those skilled in the art which permits the transfer of torque. The input disconnect portion 20 is preferably fabricated from steel which provides high structural strength for accommodating the applied loads, but any equivalent material may be used.

A segment of the input disconnect portion 20 is furthermore disposed within a duplex bearing housing 22 which is attached to the airframe 3 of the helicopter in the preferred embodiment. The duplex bearing housing 22 includes bearings 23 disposed between the input disconnect portion 20 and the duplex bearing housing 22 for permitting rotation of the input disconnect portion 20 therein. The input disconnect portion 20 is, therefore, supported by and extends through the duplex bearing housing 22. A shoulder 25 is formed on a section of the input disconnect portion 20 that protrudes from the aft opening 24 of the duplex bearing housing 22.

Figure 3A:
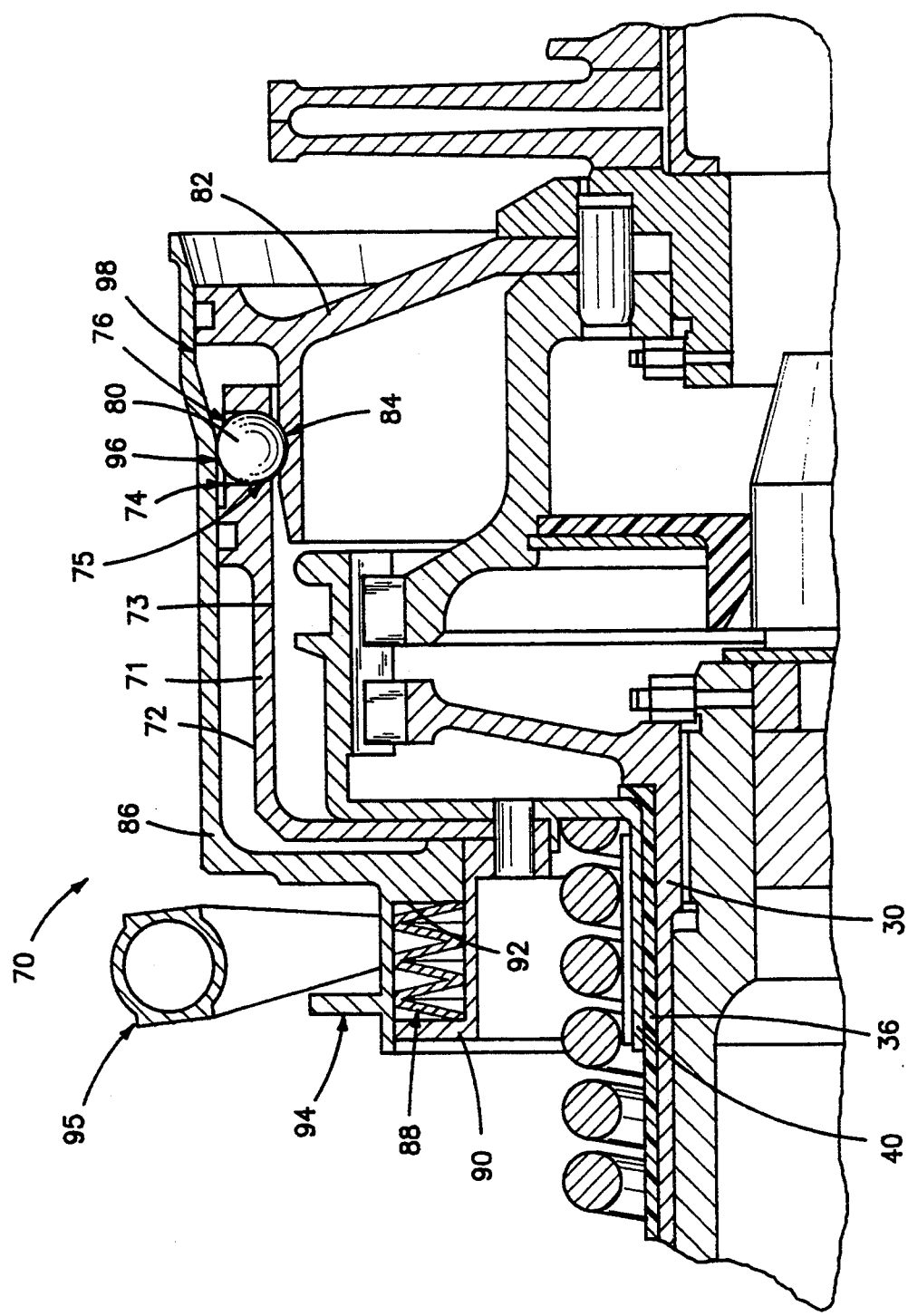
FIG. 3a is an enlarged cross-sectional view of the locking mechanism of the present invention in its locked position with the drive shaft segments coupled.

A male input spline 30 is disposed about and mounted to the input disconnect portion 20 through a splined attachment 32, although the mounting can be done by any of a number of ways. Alternatively, the male input spline may be formed as an integral element of the input disconnect portion. The male input spline 30 is preferably fabricated from steel or any suitable material with high structural properties. The male input spline 30 is retained on the input disconnect portion 20 via a locking nut 34, which prevents axial travel of the male input spline 30. The male input spline 30, additionally, bears against a spacer 38 which is disposed between the shoulder 25 and the male input spline 30. A female spline assembly 40 is disposed about and slidably mounted to the male input spline 30. Furthermore, the female spline assembly 40 intermeshes with the male input spline 30. The female spline assembly 40 is preferably fabricated from a high strength material such as steel. In the preferred embodiment, and as illustrated in FIG. 3a, a nylon sleeve material 36 is disposed between the surfaces of the female spline assembly 40 and the male input spline 30 that are in sliding contact. The nylon sleeve material 36 acts to minimize friction between the parts thereby providing ease of motion. It should be noted that while in the preferred embodiment the female spline assembly 40 mounts to the male input spline 30, it is also possible to slidably mount the female spline assembly 40 to the input disconnect portion 20 provided adequate motion can be achieved.

Referring back to FIG. 2, a coil spring 42 is disposed between the female spline assembly 40 and the input disconnect portion 20 and functions to bias the female spline assembly 40 with respect to the input disconnect portion 20. One end of the coil spring 42 bears on a face 26 of shoulder 25 with the other end of the coil spring 42 bearing against an outer face 41 of the female spline assembly 40. In the preferred embodiment, the coil spring 42 is fabricated from steel and has a compressive spring force of 300 pounds. It should be noted that although a coil spring 42 is used in the preferred embodiment, those skilled in the art will appreciate that any equivalent biasing means may be utilized.

A male output spline 50 engages with the female spline assembly 40 when the input and output drive shaft segments 100, 200 are coupled. The male output spline 50 is preferably made from a high strength material such as steel and is formed on an output disconnect portion 205 of the output drive shaft segment 200. The output disconnect portion 205 functions as an extension of the output drive shaft segment 200. In the preferred embodiment, the male output spline 50 is a separate element mounted to the output disconnect portion 205 through a locking nut arrangement.

In the drive system, flexibility is provided between the input and output drive shaft segments 100, 200 for accommodating angular and axial misalignment. Flexibility is achieved through a flexible coupling 214 disposed between the output disconnect portion 205 and the output drive shaft segment 200. The flexible coupling 214 is welded to the output disconnect portion 205 and a fixed flange member 210. The fixed flange member 210 is mounted to the output drive shaft 200 through a bolted arrangement 216. Although in the preferred embodiment the fixed flange member 210 is a separate component interposed between the flexible coupling 214 and the output drive shaft segment 200, it is should be understood that the fixed flange member 210 could also just as easily be integral with either. The flexible coupling 214 permits axial and angular motion of the output disconnect portion 205 with respect to the fixed flange member 210, thereby permitting misalignment of the coupled drive shaft segments 100, 200 while maintaining torque transmission therebetween. The preferred embodiment utilizes a diaphragm coupling manufactured by Lucas Co. of Utica, N.Y. as the flexible coupling. A similar coupling is shown in U.S. Pat. No. 4,457,734 and referred to as a "Bendix coupling" manufactured by Bendix Corporation. Although the requirement for flexibility is accommodated by means of a flexible coupling, those skilled in the art will realize and appreciate that a variety of methods for permitting displacement may be employed in the present invention.

Torque drive redundancy is designed into the attachment of the output disconnect portion 205 to the output drive shaft 200 by means of a secondary coupling 218 which facilitates load transfer in the event that the flexible coupling 214 should fail. One end of the secondary coupling 218 is attached to the output disconnect portion 205. The other end of the secondary coupling 218 includes a plurality of splines 220 formed thereon which splines correspondingly mate with splines 221 formed on the fixed flange member 210. During normal operation, the splines 220, 221 are separated by a small distance, and moreover, are crowned or rounded along their length so as not to interfere with the angular or axial motion of the output disconnect portion 205 and the flexible coupling 214 with respect to the fixed flange member 210. Furthermore, during normal operation the splines 220, 221 do not transfer any torsional loads. In the event of a failure of the flexible coupling 214, the output disconnect portion 205 will rotate slightly with respect to the fixed flange member 210 until the splines 220 of the secondary coupling 218 engage with the splines 221 of the fixed flange member 210, thereby facilitating the transfer of torque. Torque drive redundancy can also be accomplished through a gear tooth arrangement or any similar engagement means known to those skilled in the art.

Engagement between the male input spline 30, the female spline assembly 40 and the male output spline 50 provides a means for transferring torque from input drive shaft segment 100 to the output drive shaft segment 200. The ability of the output disconnect portion 205 to move relative to the fixed flange member 210 permits the engagement between the female spline assembly 40 and the male output spline 50 to be designed with relatively no angular or axial motion capability, thereby providing for highly efficient torque transfer capability.

In order to facilitate the engagement of the female spline assembly 40 with the male output spline 50 during coupling, a means for guiding the two members is provided. The guide means includes a guide pin 60 mounted on the input disconnect portion 20 and, in the preferred embodiment, the longitudinal axis 61 of the guide pin 60 is coincident with the longitudinal axis 11 of the input disconnect portion 20. The guide pin 60 is press fit into an aperture 63 formed in the input disconnect portion 20. Furthermore, a guide sleeve 62 is mounted to the male output spline 50 and has a funnel-shaped guide channel 64 formed therethrough, The guide sleeve 62 is, moreover, located so as to permit the guide channel 64 to accept and pilot the guide pin 60 during coupling. Minimal tolerance is provided between the guide pin 60 and the guide channel 64 thereby permitting accurate alignment of the male output spline 50 to the female spline assembly 40. The guide pin 60 and the guide sleeve 62 are both preferably manufactured from a material, such as nylon, which provides reduced friction between the two during coupling, as well as minimizes weight. It should be noted that the location of the guide pin 60 and the guide sleeve 62 on the drive shaft segments could be reversed without detracting from the invention.

As stated earlier, in order for the torque to transfer from the input drive shaft segment 100 to the output drive shaft segment 200, the male input spline 30 must be in mesh with the female spline assembly 40 which, in turn, must also be in mesh with the male output spline 50 so as to provide a continuous load path. As is depicted in FIG. 2, the intermeshing of these splines is maintained by the force of the coil spring 42. In the event of excessive flexing of the input drive shaft segment 100 with respect to the output drive shaft segment 200, or wherein the two drive shaft segments move in opposite directions to one another, such as when the support structure flexes, it is possible that the male output spline 50 may separate from the female spline assembly 40. In the event that this does happen, torque can no longer be transmitted from the power source 1 to the driven component 2.

To prevent loss of torque transmission, the present invention incorporates a locking mechanism 70 as depicted in FIG. 3a. The locking mechanism 70 secures the female spline assembly 40 to the male output spline 50 in the coupled position, thereby preventing axial displacement between the two.

The locking mechanism 70 is substantially unloaded in a torque-wise direction, which is the direction of the transmission of torque from the input drive shaft segment 100 to the output drive shaft segment 200 as illustrated in FIG. 1a. That is, the locking mechanism 70 is not utilized to transmit torque from the input drive shaft segment 100 to the output drive shaft segment 200, rather, torque is transmitted via engagement between the male input spline 30, the female spline assembly 40, and the male output spline 50, respectively.

The locking mechanism 70 includes a cage segment 71 secured to the female spline assembly 40, e.g., by means of bolts (not shown). The cage segment 71 is disposed about the female spline assembly 40 and preferably is concentric with the same. The cage segment 71 additionally has an outboard surface 72 and an inboard surface 73. The cage segment 71, furthermore, has a plurality of apertures 76 formed therethrough for retaining a plurality of locking balls 80. The apertures 76 each have first and second diameters 74, 75 corresponding, respectively, with the outboard and inboard surfaces 72, 73 of the cage segment 71. The first diameter 74 is larger then the second diameter 75 and, furthermore, the first diameter 74 must be of sufficient size for permitting a locking ball 80 to fit therethrough. Moreover, the second diameter 75 must be smaller then the diameter of the locking ball 80 so as to retain the same therein. However, the second diameter 75 of the apertures 76 must also be large enough to permit a portion of the locking ball 80 to protrude therethrough. In the preferred embodiment there are fourteen locking balls 80 disposed equally about the circumference of the cage segment 71, each locking ball 80 has a diameter of approximately 0.5 inches. The first diameter 74 of the apertures 76 is, preferably, about 0.5 inches, and the second diameter 75 of the apertures 76 is, preferably, about 0.435 inches. The locking ball 80 will, therefore, protrude from the inboard surface approximately 0.125 inches.

An output coupler 82 is secured to the male output spline 50, e.g., by means of bolts (not shown) and has an outer circumference with a plurality of locking detents 84 formed therein. The output coupler 82, furthermore, is secured such that its outer circumference is positioned beneath the inboard surface 73 of the cage segment 71 in the coupled position and, more specifically, such that each locking detent 84 is aligned with a corresponding aperture 76 of the cage segment 71. Furthermore, the locking detent 84 of the output coupler 82 is positioned to receive the protruding portion of the locking ball 80 in the coupled position.

The locking mechanism 70 also includes an outer housing 86 which is slidably disposed about the cage segment 71. The outer housing 86 is biased against the female spline assembly 40, the biasing force being provided by means of belleville springs 88 disposed between a ring retainer 90, which is mounted to the female spline assembly 40, and a reaction surface 92 of the outer housing 86. The belleville springs 88 have a spring force less than that if the coil spring 42 and, more preferably, have a spring force of about 140 pounds. Although the present invention utilizes belleville springs 88 for biasing, other springs, i.e., wave or small coil springs, may be used in their stead. The outer housing 86 furthermore includes a yoke channel 94 for receiving a yoke 95.

The outer housing 86 functions as a means for retaining the locking balls 80 within the apertures 76 and has two primary positions with respect to the cage segment 71, corresponding to a locked and an unlocked position. FIG. 3a depicts the locked position of the outer housing 86, wherein the outer housing 86 abuttingly engages the cage segment 71, female spline assembly 40 combination, due to the biasing action of the belleville springs 88, i.e., the belleville springs 88 have minimal compressive loads applied thereto. In the locked position, a locking surface 96 of the outer housing 86 urges the locking balls 80 into the apertures 76 such that a portion of the locking balls protrude through the inboard surface 73 of the cage segment 71. The locking surface 96 prevents the locking balls 80 from moving out of the apertures 76, thus the locking balls 80 are secured therein.

Figure 3B:
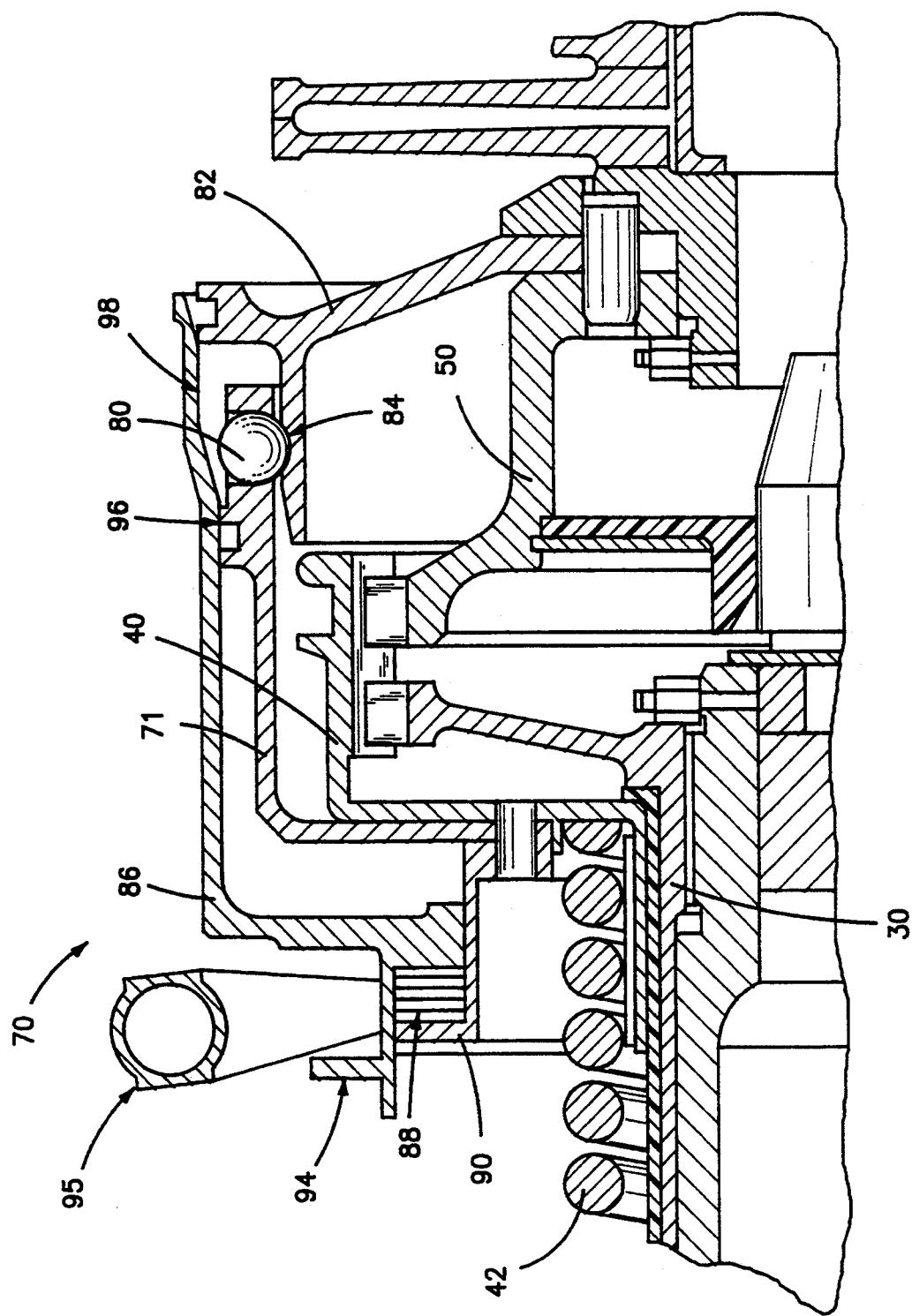
FIG. 3b is an enlarged cross-sectional view of the locking mechanism of the present invention in its unlocked position with the drive shaft segments coupled.

FIG. 3b depicts the unlocked position of the outer housing 86, wherein the outer housing 86 is spaced apart from the cage segment 71, female spline assembly 40 combination, such that the belleville springs 88 are compressed by the reaction surface 92.

Transition of the outer housing from the locked to the unlocked position is accomplished by way of the yoke 95. The yoke 95 interacts with a yoke channel 94 to urge the outer housing 86 away from the cage segment 71, female spline assembly 40 combination. The reaction surface 92, in turn, compresses the belleville springs 88 against the ring retainer 90. The yoke 95 can be either hydraulically actuated or manually stroked. In the unlocked position, the locking balls 80 are no longer completely locked within the apertures 76, but instead are loosely reserved therein by a retaining surface 98 of the outer housing 86.

Referring back to FIG. 3a, in the locked position with the drive shafts coupled, the locking detents 84 of the output coupler 82 are aligned with the apertures 76.

The protruding portion of the locking balls 80 engage with the locking detents 84, thereby locking the female spline assembly 40 to the male output spline 50. Hence, the locking mechanism 70 prevents the female spline assembly 40 from moving away from the male output spline 50 keeping the input drive shaft 100 coupled to the output drive shaft 200.

Figure 3C:
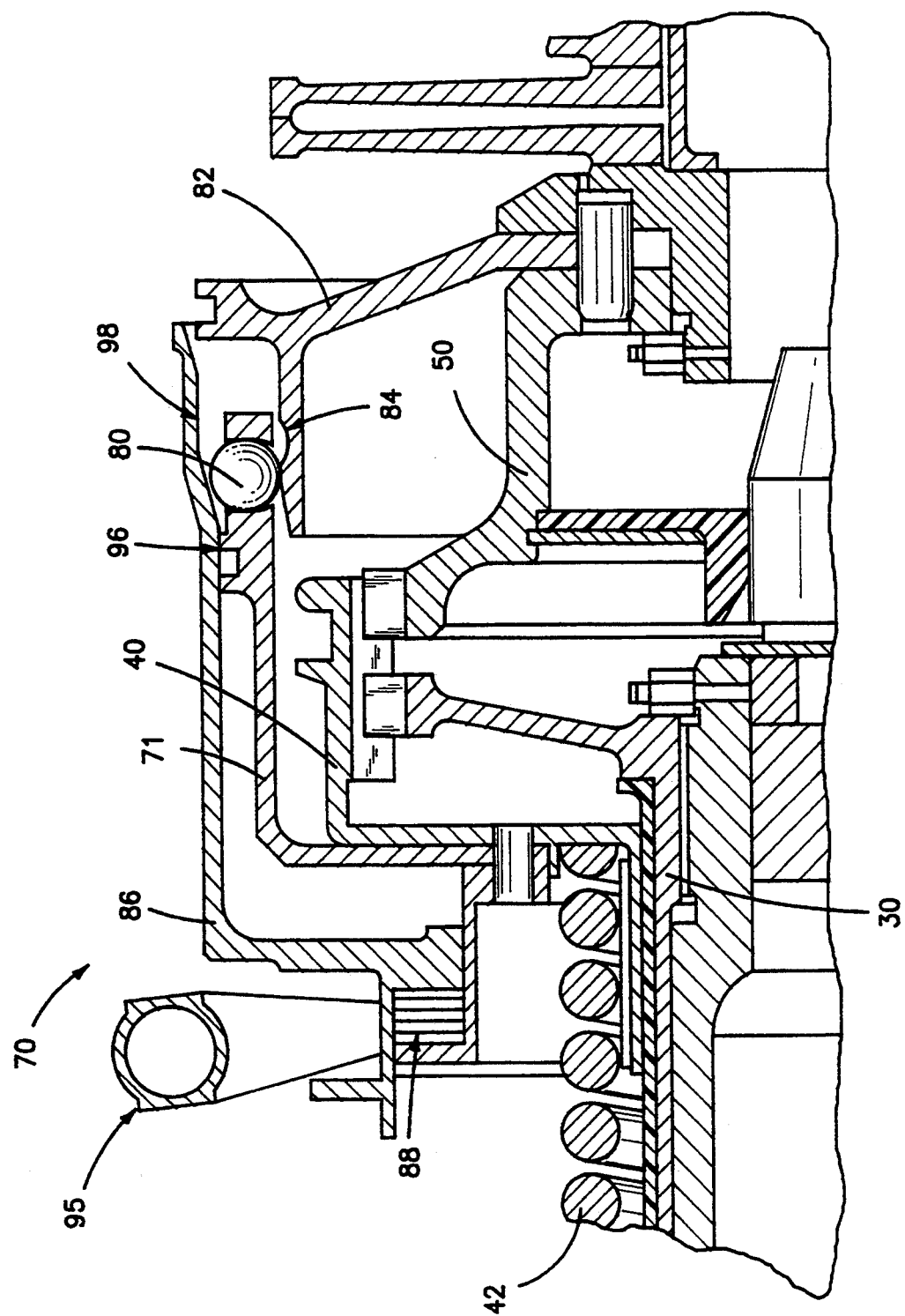
FIG. 3c is an enlarged cross-sectional view of the locking mechanism of the present invention in its unlocked position with the drive shaft segments beginning to decouple.
Figure 3D:
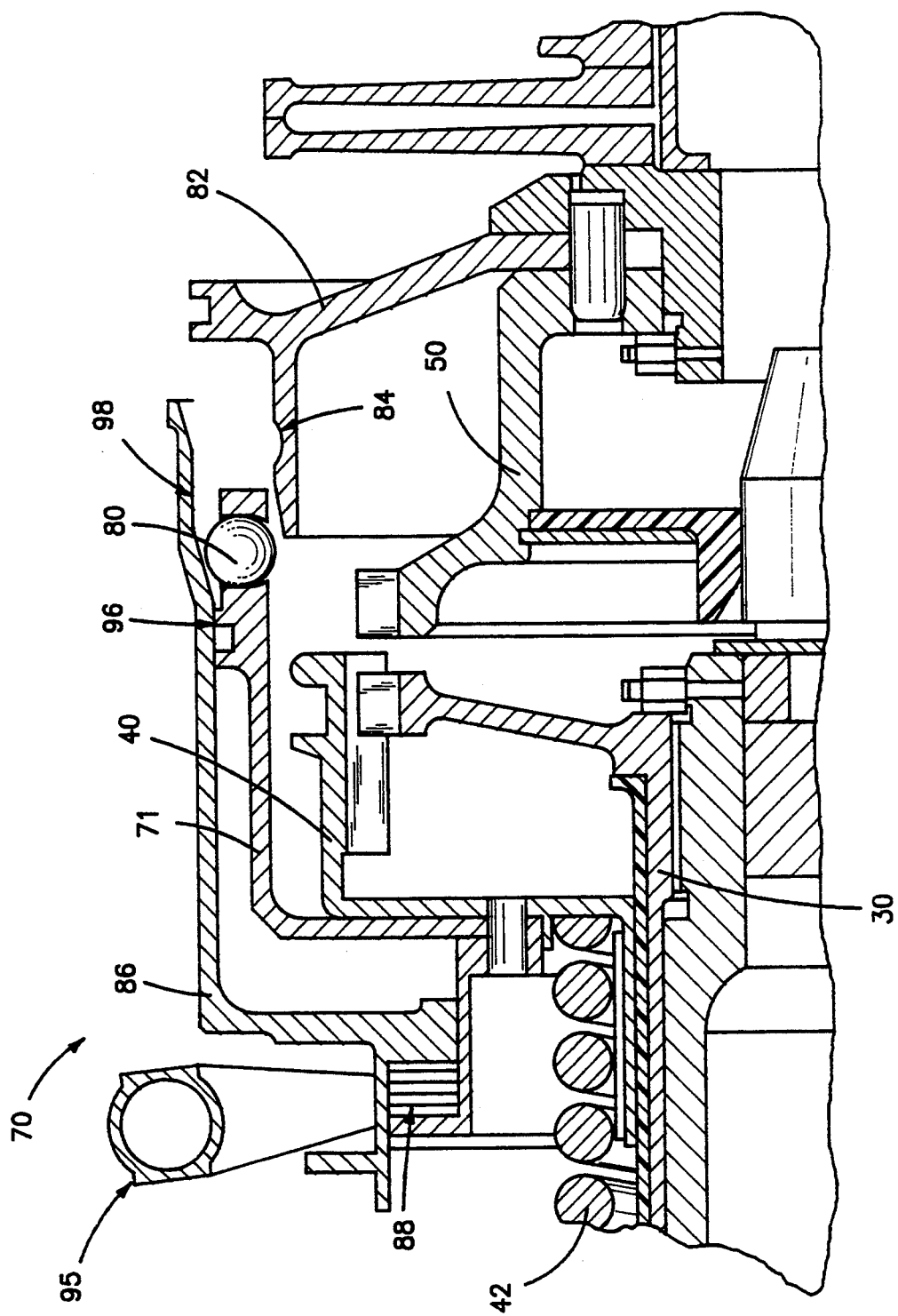
FIG. 3d is an enlarged cross-sectional view of the locking mechanism of the present invention in its disconnected position with the drive shaft segments completely decoupled.

To uncouple the two drive shaft segments 100, 200, the locking mechanism 70 must first be unlocked such that the locking balls 80 are no longer secured within the apertures 76 and the locking detents 84. Referring to FIG. 3b, this is accomplished through the use of the yoke 95 to compress the belleville springs 88. When the belleville springs 88 are compressed approximately 0.75 inches, the outer housing 86 is in the unlocked position. At this point the locking balls 80 are no longer secured within the locking detents 84. Accordingly, the female spline assembly 40 is no longer locked to the male output spline 50 although they are still coupled. Complete decoupling is provided by the continued stroke or actuation of the yoke 95 to move the outer housing 86 from the unlocked position to a disconnect position, as depicted in FIGS. 3c and 3d. When the belleville springs 88 reach their fully compressed state, the yoke 95 begins to urge the ring retainer 90 to slide the cage segment 71, female spline assembly 40 combination along the surface of the male input spline 30, compressing the coil spring 42 and forcing the female spline assembly 40 out of engagement with the male output spline 50.

Once the female spline assembly 40 is disengaged from the male output spline 50, torque can no longer be transmitted between the input and output drive shaft segments 100, 200 and, therefore, it is possible to separate the two.

The incorporation of the locking mechanism 70 into the coupling device prevents the uncoupling of the two drive shaft segments 100, 200 that can occur due to excessive flexing of the support structure. The locking mechanism also prevents axial displacement of the female spline assembly 40 from the male output spline 50, thereby minimizing wear of the splines. The ability of the locking mechanism 70 to be disengaged enables the coupling device to be utilized in a drive system where decoupling of the drive shaft segments is necessitated, e.g., folding of a helicopter tail section. The drive system of the present invention provides flexibility to accommodate misalignment and displacement of the two drive shaft segments 100, 200 that can occur due to movement of the support structure, as well as applied vibratory loads, while still transmitting torque.

Figure 4:
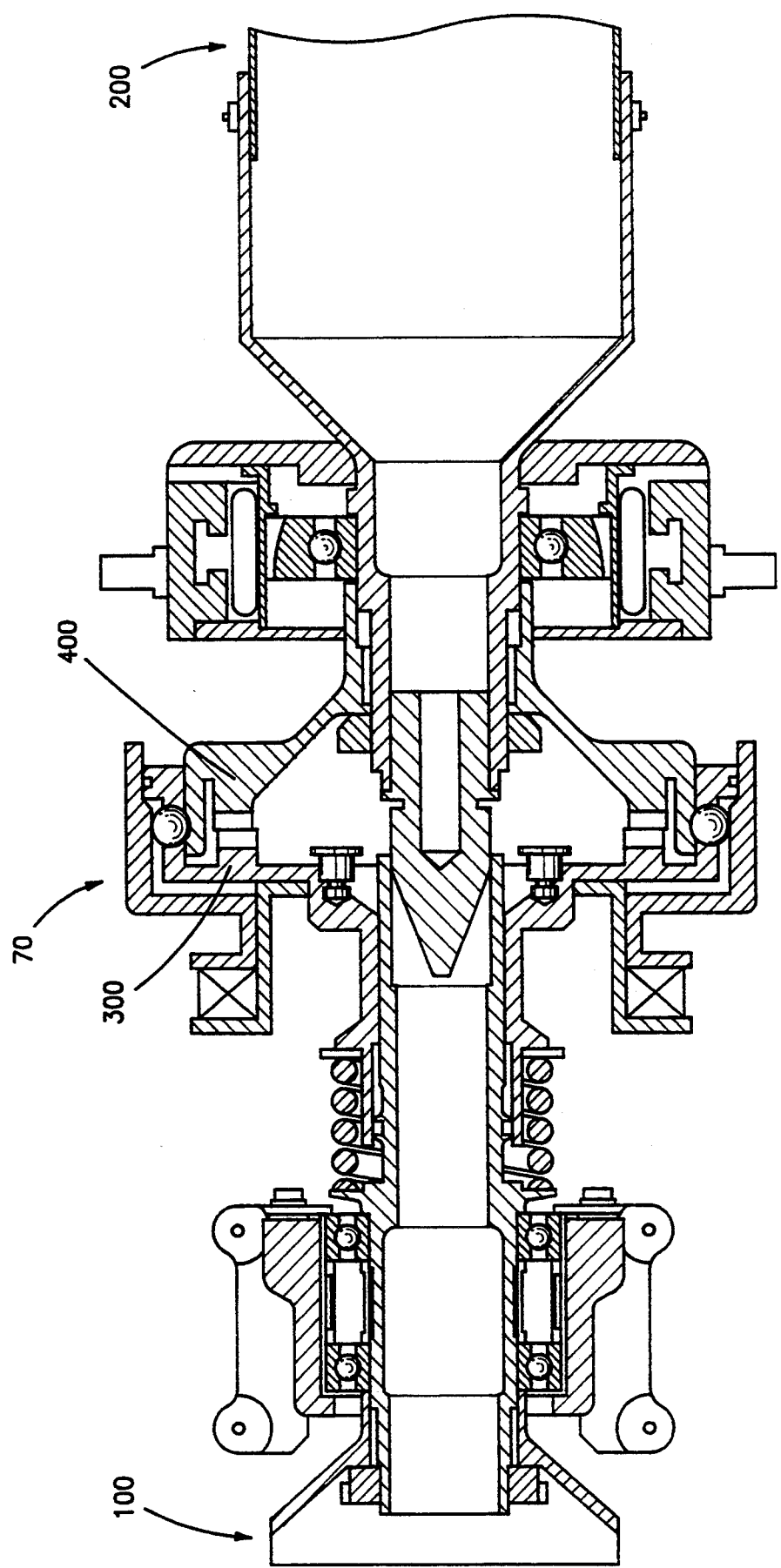
FIG. 4 is a cross-sectional view of the locking mechanism of the present invention as it is incorporated in a drive system having face gears.

The locking mechanism 70 of the present invention can also be incorporated into a drive system which includes input and output face gears 300, 400 as the means for transmitting torque as depicted in FIG. 4. In such a system the locking mechanism 70 is disposed about and mounted to the face gears 300, 400 so as to envelope the same. The drive shaft segments 100, 200 can be decoupled by unlocking the locking mechanism 70 as described and illustrated above, in the preferred embodiment. Once unlocked, the input face gear 300 is urged away from the output face gear 400, preventing the transmission of torque. The drive shaft segments 100, 200 can then be separated.

Although the invention has been described and illustrated with respect to exemplary embodiments thereof, is should be understood by those skilled in the art that the foregoing and various other changes, omissions and additions may be made therein and thereto, without departing from the spirit and scope of the present invention.

What is claimed is:

1. In a drive train having input and output drive shaft segments, a coupling device comprising:
   means for transmitting torque from the input drive shaft segment to the output drive shaft segment, said torque transmitting means having a coupled position and a decoupled position, wherein said transmitting means is operative to transmit torque in said coupled position, said torque transmitting means including:
   a male input spline operatively interconnected with the input drive shaft segment,
   a female spline assembly disposed about and slidably mounted to the input drive shaft segment, said female spline assembly furthermore slidably engaging said male input spline, and
   a male output spline mounted to the output drive shaft segment, said male output spline furthermore slidably engaging said female spline assembly in said coupled position; and
   means interconnected with said torque transmitting means and operative in a position for locking said female spline assembly to said male output spline in said coupled position to prevent axial displacement of said female spline assembly and said male output spline with respect to one another, said locking means furthermore having a disconnect position wherein said torque transmitting means is in said decoupled position, said locking means additionally being unloaded in a torque-wise direction in said locked position, said locking means including:
   a cage segment secured to said female spline assembly, said cage segment having a plurality of apertures formed therethrough,
   a plurality of locking balls disposed within said apertures,
   an output coupler secured to said male output spline, said output coupler having a plurality of locking detents formed therein for seating said locking balls in said coupled position,
   an outer housing slidably disposed about said cage segment, said outer housing having a locking surface for urging said plurality of said locking balls into said locking detents of said output coupler in said locked position thereby securing said female spline assembly to said male output spline, and said outer housing furthermore having a retaining surface for reserving said locking balls within said apertures in said unlocked position, and
   means for translating said outer housing between said locked position and an unlocked position, and vice versa, said translating means being further operative in translating said outer housing from said unlocked position to said disconnect position.

2. The coupling device of claim 1 wherein said torque transmitting means further comprises:
   means disposed between said female spline assembly and the input drive shaft segment for biasing said female spline assembly into engagement with said male output spline.

3. The coupling device of claim 2 wherein said biasing means is a coil spring.

4. The coupling device of claim 3 wherein said coil spring has a spring force of about 300 pounds.

5. The coupling device of claim 1 wherein said translating means comprises:
   at least one belleville spring disposed between said outer housing and said female spline assembly for urging said outer housing into said locked position; and
   means for transitioning said outer housing between said locked and unlocked positions.

6. The coupling device of claim 5 wherein said transitioning means is a yoke.

7. The coupling device of claim 5 wherein said at least one belleville spring has a spring force of about 140 pounds.

8. The coupling device of claim 1 wherein said plurality of locking balls is at least six.

9. The coupling device of claim 8 wherein said plurality of locking balls is within the range of 12 balls to 16 balls.

10. In a drive train having input and output drive shaft segments, a coupling device comprising:
    means for transmitting torque from the input drive shaft segment to the output drive shaft segment, said torque transmitting means having a coupled position and a decoupled position, and wherein said transmitting means is operative to transmit torque in said coupled position, said torque transmitting means including:
    a male input spline operatively interconnected with the input drive shaft segment,
    a female spline assembly disposed about and slidably mounted to the input drive shaft segment, said female spline assembly furthermore slidably engaging said male input spline,
    a male output spline mounted to the output drive shaft segment, said male output spline furthermore slidably engaging said female spline assembly in said coupled position, and
    means for guiding said female spline assembly and said male output spline into said coupled position, said guiding means including:
    a guide pin mounted to the input drive shaft segment, and
    a guide sleeve mounted to said male output spline, said guide sleeve having a funnel-shaped guide channel formed therethrough for accepting and piloting said guide pin; and
    means interconnected with said torque transmitting means and operative in a position for locking said torque transmitting means in said coupled position to prevent axial displacement of the drive shaft segments relative to one another, said locking means furthermore having a disconnect position wherein said torque transmitting means is in said decoupled position, and said locking means additionally being unloaded in a torque-wise direction in said locked position.

11. A drive system for transmitting torque from a power source to a driven component, comprising:
    an input drive shaft segment rotatably mounted to the power source;
    an output drive shaft segment rotatably mounted to the driven component;
    an output disconnect portion;
    means for transmitting torque from said input drive shaft segment to said output disconnect portion;
    locking means operatively interconnected with said torque transmitting means for preventing axial displacement of said input drive shaft segment from said output disconnect portion, said locking means furthermore being unloaded in a torque-wise direction; and misalignment means disposed between and mounted to said output disconnect portion and said output drive shaft segment for permitting axial and angular motion therebetween, said misalignment means being further operative to transmit torque from said output disconnect portion to said output drive shaft segment, said misalignment means including:

a fixed flange member mounted to said output drive shaft segment, and a flexible coupling disposed between and mounted to said fixed flange member and said output disconnect portion, said flexible coupling facilitating axial and angular motion of said output disconnect portion with respect to said output drive shaft segment.

* * * * *